United States Patent [19]

Vladimirov et al.

[11] 4,115,867

[45] Sep. 19, 1978

[54] SPECIAL-PURPOSE DIGITAL COMPUTER FOR COMPUTING STATISTICAL CHARACTERISTICS OF RANDOM PROCESSES

[76] Inventors: Evgeny Evgenievich Vladimirov, ulitsa Yaroslava Gasheka, 2, kv. 1; Vladimir Gerasimovich Korchagin, prospekt Veteranov, 144/21, kv. 202; Jury Borisovich Sadomov, ulitsa Tipanova, 2, kv. 17; Lev Mikhailovich Khokhlov, ulitsa Gertsena, 47, kv. 10, all of Leningrad, U.S.S.R.

[21] Appl. No.: 813,162

[22] Filed: Jul. 5, 1977

[51] Int. Cl.$^2$ .................. G06F 7/00; G06F 15/06; G06F 15/36
[52] U.S. Cl. .................................. 364/900; 364/554
[58] Field of Search ... 364/900 MS File, 200 MS File, 364/554

[56] References Cited

U.S. PATENT DOCUMENTS

| | | | |
|---|---|---|---|
| 3,345,616 | 10/1967 | Avril et al. | 364/900 |
| 3,835,456 | 9/1974 | Angelle et al. | 364/900 |

*Primary Examiner*—Melvin B. Chapnick

*Attorney, Agent, or Firm*—Lackenbach, Lilling & Siegel

[57] ABSTRACT

A special-purpose digital computer for statistical data processing having a random-number generator connected through a clock to stochastic data rounding units. The first two stochastic data rounding units are connected to input data lines and to a quantization step counter to which the other stochastic data rounding units are also connected. The computer also includes three receiving registers, the first two registers being connected through gate units to respective stochastic data rounding units and, the first and third receiving registers being connected to an output of a shift register unit. The output of the shift register unit is also connected to its own input, to outputs of the last two receiving registers and to an input of the last stochastic data rounding unit. The clock is also connected to gate units. A data accumulator is connected to the first two stochastic data rounding units, to respective output lines, to a single-time step multiplier, which is connected to the last two stochastic data rounding units, and to a read-only memory. The memory is coupled to the clock, to the random-number generator, to the receiving registers, to the shift register unit and to an adder, which is connected to the first receiving register and to respective output lines.

2 Claims, 6 Drawing Figures

SPECIAL-PURPOSE DIGITAL COMPUTER FOR COMPUTING STATISTICAL CHARACTERISTICS OF RANDOM PROCESSES

FIELD OF THE INVENTION

The present invention relates generally to data processing devices and, more particularly, to a special-purpose digital computer for statistical data processing.

Many natural and man-induced phenomena, which are requisite for solving a number of problems in such spheres of science and technology as hydrometeorology, geophysics, medicine, electronics, and nuclear physics, are of a random nature. For this reason, statistical processing of information becomes a number one task at the present time, because accumulation of large amounts of input data for statistical processing is economically unprofitable and, in some cases, a delay in processing may even make the information worthless.

Therefore, the designers and manufacturers of computing equipment are facing an urgent need to create a high-performance, cheap and compact special purpose-digital computer for computing statistical characteristics of random processes that has a wide range of functional capabilities. This task has to some extent been solved by the present invention.

Most practical problems in studying and using multiparameter phenomena involve random processes characterized by random changes of physical quantities with time.

Random processes are described by random functions $X(t)$ or $Y(t)$ and contain a plurality of realizations of these functions, namely $x_1(t), x_2(t), \ldots, x_i(t), \ldots, x_k(t)$ or $y_1(t), -y_2(t), \ldots y_i(t), \ldots, y_k(t)$, which are an array of random numbers from 1 to $k$.

At present, statistical characteristics are computed on statistical analyzers, which use digital methods of calculation and are able to make real-time computation, or on digital computers, which are specially adapted for calculating statistical characteristics of random processes.

Usually, statistical analyzers are high-complexity devices with high hardware redundancy, which increases the costs of manufacture of such analyzers and makes it impossible to use them for "coarse - fine" measurements. Moreover, these machines have limited functional capabilities which narrows their use in a number of applications. On the other hand, digital computers are expensive and do not permit real-time computation. Solution of statistical processing tasks on the IBM-360 digital computer, in particular, correlation and spectral analysis, requires as long as several hours.

DESCRIPTION OF THE PRIOR ART

A field digital random signal analyzer is known in the art. This analyzer comprises an analog-to-digital converter and a stochastic data rounding unit, an input of which is connected to an output of the analog-to-digital converter. A dynamic storage unit has one input connected to an output of the stochastic data rounding unit and one output connected to an input of a stochastic binary element. A uniform random number generator and an AND circuit unit, a digital-to-analog converter are also included in the unit. A comparator has one input connected to an output of the uniform random-number generator and to a second output of the stochastic data rounding unit and a second input connected to a respective output of the dynamic storage unit. The output of the comparator is connected to an input of the AND circuit unit. A control unit has an output connected to a second input of the stochastic data rounding unit and to a respective input of the dynamic storage unit. An integrator has one input is connected to a second output of the control unit and an output connected to an input of the digital-to-analog converter. Connected to a third output of the control unit is a respective input of the AND circuit unit. A respective output of the AND circuit unit and an output of the stochastic binary element are connected to inputs of the control unit. A second input of the stochastic binary element is connected to a respective output of the uniform random number generator.

Also known in the prior art is a special-purpose digital computer for statistical data processing.

This special-purpose computer comprises a random-number generator, for producing a uniform pseudo-random number sequence, and stochastic data rounding units which are intended for linear conversion of a code into its probability and stochastic rounding of numbers, multi-channel inputs of the first two stochastic data rounding units being connected to respective input data lines. The computer also includes a shift register unit and receiving registers, multi-channel inputs of the first two receiving registers being electrically connected to multi-channel outputs of respective stochastic data rounding units, a multi-channel input of the third receiving register being interconnected with a multi-channel input of the first receiving register and coupled to a multi-channel output of the shift register unit which is connected with its multi-channel input, with multi-channel outputs of the second and third receiving registers and with a multi-channel input of the fourth stochastic data rounding unit. The computer also comprises a data accumulator and a single-time step multiplier unit for stochastic multiplication of numbers. The multiplier has one input connected to an output of the third stochastic data rounding unit, a second input connected to an output the fourth stochastic data rounding unit, and an inputs connected to outputs of the third and fourth stochastic data rounding units and to an input of the data accumulator. A multi-channel output of the data accumulator is connected to multi-channel inputs of the first and second stochastic data rounding units and to other output lines. A microprogram control unit has a multi-channel output connected to inputs of the random-number generator, the receiving registers, the shift register unit and the data accumulator. A harmonic and "correlation window" function generator has its output connected to one of the inputs of the first receiving register.

The above known devices can not compute the unconditional entropy of random processes with independent measurements, which narrows their functional capabilities and the application range, makes the devices unsuitable for solving a number of tasks, does not provide data compression in these devices, and thus, increases the physical dimensions of the special-purpose digital computer and the costs of statistical processing of information.

SUMMARY OF THE INVENTION

It is an object of the invention to provide a special-purpose digital computer for statistical data processing which can be used for computing unconditional entropy of random processes with independent measurements.

Another object of the invention is to provide a special-purpose digital computer for statistical data processing which would ensure data compression.

A further object of the invention is to provide a special-purpose digital computer with minimum costs of the hardware.

The foregoing and other objects of this invention are attained by a special-purpose digital computer for statistical data processing, which comprises a random-number generator, for producing a uniform pseudo-random number sequence and stochastic data rounding units, which are intended for linear conversion of the code into its probability and for stochastic rounding of numbers and, said rounding units being electrically connected to the random-number generator, and multi-channel inputs of the first and second stochastic data rounding units being connected to respective input data lines. A shift register unit and receiving registers are also included. Multi-channel inputs of the first two receiving registers are electrically connected to multi-channel outputs of respective stochastic data rounding units, and a multi-channel input of the third receiving register is interconnected with a multi-channel input of the first receiving register, which is coupled to the third stochastic data rounding unit, and connected to a multi-channel output of the shift register unit. The multi-channel output of the shift register is connected to its multi-channel input, to multi-channel outputs of the last two receiving registers and to a multi-channel input of the last stochastic data rounding unit. A data accumulator, which is intended for accumulation and group shift of information and a single-time step multiplier unit for stochastic multiplication of numbers, are also included. Inputs of the multiplier are connected, respectively, to outputs of the last two stochastic data rounding units, which are also connected to an output of the single-time step multiplier and connected to an input of the data accumulator. A multi-channel output of said data accumulator is connected to multi-channel inputs of the first two stochastic data rounding units and to respective output lines. This invention also contains a quantization step counter, which is intended for determining data intervals in quantization, with multi-channel outputs connected to other multi-channel inputs of the stochastic data rounding units. A read-only memory, for storing harmonic functions, "correlation window" functions, values of functions of the type $$\eta = -P \log_2 P$$

and microinstructions, has one multi-channel input connected to a multi-channel output of the data accumulator. A multi-channel input of the data accumulator is connected to multi-channel outputs of the first two stochastic data rounding units. Electric connection of the first two receiving registers with respective stochastic data rounding units is through respective gate units, and electric connection between the random-number generator and the stochastic data rounding units is accomplished through a clock. The clock has one multi-channel output connected to other multi-channel inputs of the stochastic data rounding units, a second multi-channel output connected to a multi-channel input of the read-only memory, one output connected to an input of the quantization step counter and further outputs connected to inputs of respective gate units. A adder has a multi-channel input connected to a multi-channel output of the read-only memory. A second input of the adder is connected to the random-number generator inputs, inputs of the receiving registers, inputs of the clock, of the data accumulator, and of the shift register unit. A multi-channel output of said adder is connected to an input of the first receiving register and is coupled to respective output lines.

It is preferable that the read-only memory comprises an input unit intended for receiving, decoding and shifting a data address code. A constants unit designed, for storing permanent information, has a multi-channel input connected to a multi-channel output of the input unit, a multi-channel input of the input unit serves as a multi-channel input of the read-only memory. An output register for receiving data and a microinstruction decoder are also included. A multi-channel input of the decoder is electrically connected to an output of the output register. A multi-channel input of the output register is connected to a multi-channel output of the constants unit. Address code gates and a data mark decoder are also included. A multi-channel input of the data mark decoder is connected to a multi-channel output of the output register and a multi-channel output of the data mark decoder is connected to a multi-channel input of the microinstruction decoder. Electric connection between the output register and the microinstruction decoder is through OR circuits for a direct and an inverted code and through direct and inverted code gates. Some inputs of the OR circuits for a direct and inverted code are connected to respective outputs of the output register and their outputs are connected to inputs of gates for a direct and inverted code, respectively. Outputs of respective direct and inverted code gates are interconnected and coupled to multi-channel inputs of the microinstruction decoder and of the input unit. Some inputs of the address code gates are connected to a multi-channel input of the constants unit, their outputs being connected to inputs of respective OR circuits for a direct and inverted code, and other inputs being interconnected and coupled to respective inputs of a multi-channel input of the read-only memory. Other inputs of the memory are connected to interconnected inputs of respective direct and inverted code gates.

The present invention realized on the basis of stochastic data processing techniques makes it possible to appreciably increase the performance of the computer in studying random processes, in particular, in computing their statistical characteristics, to simplify electronic circuitry, to cut down hardware costs and to reduce the size of special-purpose digital computers. In addition, data compression under conditions of an ever-increasing flow of information to be processed and stored can be partially solved by using the proposed special-purpose digital computer for statistical data processing. The application of the special-purpose digital computer for statistical data processing contributes materially to technological progress in such spheres of research and technology as hydrometeorology, geophysics, meteorology, medicine, electronics and physics.

Other objects and advantages of the present invention will become apparent from the following description of a preferred embodiment thereof when read in conjunction with appended drawings, in which:

Figure 1:
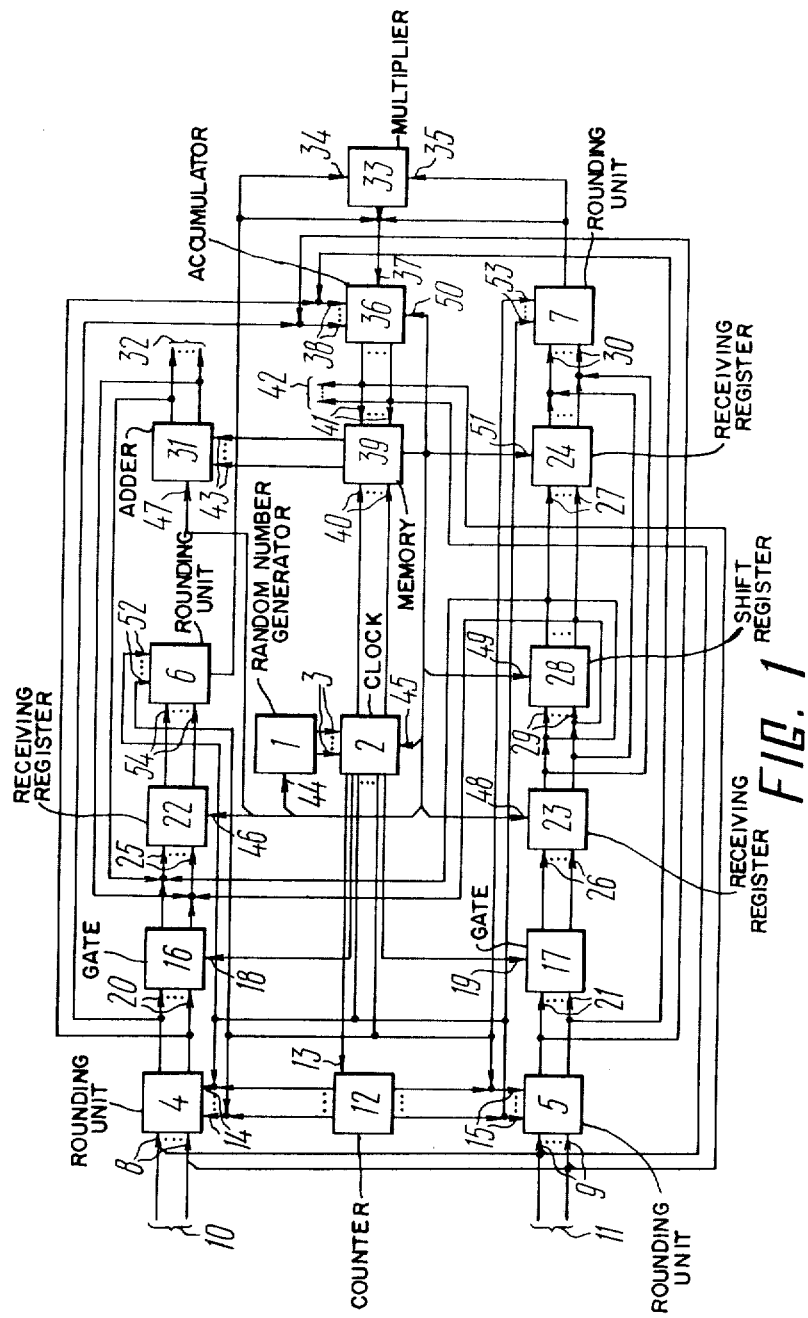
FIG. 1 is a block diagram of a special-purpose digital computer for statistical data processing, in accordance with the invention.

The special-purpose digital computer for statistical data processing comprises a random-number generator 1 (FIG. 1), a clock 2, a multi-channel input 3 of said clock 2 being connected to a multi-channel output of the generator 1, and stochastic data rounding units 4, 5, 6, 7. Multi-channel inputs 8, 9 of the units 4, 5, respectively, are connected to input data lines 10, 11.

The computer also comprises a quantization step counter 12 having an input 13 connected to an output of the clock 2, one multi-channel output connected to a multi-channel input 14 of the stochastic data rounding unit 4, and another multi-channel output connected to a multi-channel input 15 of the stochastic data rounding unit 5; and gate units 16, 17. An input 18 of the gate unit 16 and an input 19 of the gate unit 17 are connected to respective outputs of the unit 2, and multi-channel inputs 20, 21 of the gate units 16, 17 are connected, respectively, to multi-channel outputs of the units 4 and 5.

The special-purpose digital computer for statistical data processing also comprises receiving registers 22, 23, 24, a multi-channel input 25 of the receiving register 22 being connected to a multi-channel output of the unit 16, a multi-channel input 26 of the receiving register 23 being connected to a multi-channel output of the unit 17, and a multi-channel input 27 of the receiving register 24 being connected to the multi-channel input 25 of the unit 22; and a shift register unit 28 with a multi-channel input 29 connected to a multi-channel output of the unit 23 and to a multi-channel output of the unit 24 and a multi-channel output of the shift register unit 28 connected to the multi-channel input 29 of the same unit 28 and to the multi-channel input 27 of the unit 24. A multi-channel output of the unit 24 is also connected to a multi-channel input 30 of the stochastic data rounding unit 7.

Further, the computer comprises an adder 31 with a multi-channel output connected to output lines 32 and coupled to the multi-channel input 25 of the unit 22; a single-time step multiplier 33 having an input 34 connected to an output of the unit 6 and to the output of the same multiplier 33, an input 35 of the multiplier 33 connected to the output of the unit 7 and to the output of the multiplier 33; a data accumulator 36 having an input 37 connected to said output of the multiplier 33 and a multi-channel input 38 connected to the multi-channel inputs 20, 21 of the units 16, 17; a read-only memory 39 with a multi-channel input 40 connected to a multi-channel output of the clock 2, another multi-channel input 41 connected to the multi-channel output of the data accumulator 36 and to output lines 42, a multi-channel output connected to a multi-channel input 43 of the adder 31, and an output connected to an input 44 of the generator 1, to an input 45 of the clock 2, to an input 46 of the receiving register 22, to an input 47 of the adder 31, to an input 48 of the receiving register 23, to an input 49 of the unit 28, to an input 50 of the accumulator 36, and to an input 51 of the receiving register 24; the multi-channel output of the unit 2 being connected to the multi-channel inputs 14 and 15 of the units 4 and 5, a multi-channel input 52 of the unit 6 and a multi-channel input 53 of the unit 7. The other multi-channel input 54 of the unit 6 is connected to the multi-channel output of the receiving register 22.

The read-only memory 39 comprises an input unit 55 (FIG. 2) which contains an address register, an address counter and an address decoder (the address register, the address counter and the decoder are not shown). The input unit 55 employs conventionally known circuits.

The read-only memory 39 also comprises a constants unit 56 with a multi-channel input $57_1, \ldots, 57_\omega$ connected to a multi-channel output of the input unit 55, an output register 58 with a multi-channel input 59 connected to a multi-channel output of the unit 56, OR circuits $60_1, \ldots, 60_\omega$ for an inverted code, OR circuits $61_1, \ldots, 61_\omega$ for a direct code, some inputs $62_1, \ldots, 62_\omega$ and $63_1, \ldots, 63_\omega$ of the OR circuits $60_1, \ldots, 60_\omega$ and $61_1, \ldots, 61_\omega$, respectively, being connected to outputs $64_1, \ldots, 64_\omega; 65_1, \ldots, 65_\omega$ of the output register 58.

The read-only memory also comprises gates $66_1, \ldots, 66_\omega$ for the inverted code, gates $67_1, \ldots, 67_\omega$ for the direct code, and a microinstruction decoder 68.

The outputs of the gates $66_1, \ldots, 66_\omega$ and $67_1, \ldots, 67_\omega$ are interconnected and coupled to inputs $69_1, \ldots, 69_\omega$, respectively, of the multi-channel input 69 of the decoder 68 and connected to a multi-channel input 70 of the input unit 55 which is connected to the multi-channel input 41 of the read-only memory 39.

The multi-channel output of the decoder 68 is a multi-channel output of the read-only memory 39.

The read-only memory 39 also comprises a data mark decoder 71 with a multi-channel input 72 connected to the multi-channel output of the output register 58 and a multi-channel output connected to another multi-channel input 73 of the decoder 68, address code gates $74_1, \ldots, 74_\omega$ with some inputs $75_1, \ldots, 75_\omega$ connected to the inputs $57_1, \ldots, 57_\omega$ of the multi-channel input 57 of the unit 56, and other inputs $76_1, \ldots, 76_\omega$ interconnected and coupled to the multi-channel input 40 of the read-only memory 39 to which are also connected interconnected inputs $77_1, \ldots, 77_\omega$ and $78_1, \ldots, 78_\omega$ of the gates $66_1, \ldots, 66_\omega$ and $67_1, \ldots, 67_\omega$, respectively. Other inputs $79_1, 80_1$ and $79_\omega, 80_\omega$ of the gates $66_1, 67_1,$ and $66_\omega, 67_\omega$, respectively, are connected to the outputs of the OR circuits $60_1, 61_1, 60_\omega, 61_\omega$.

Inputs $81_1, 82_1$ and inputs $81_\omega, 82_\omega$, respectively, of the OR circuits $60_1, 61_1$ and OR circuits $60_\omega, 61_\omega$ are interconnected and coupled to the outputs of the address code gates $74_1, \ldots, 74_\omega$.

Figure 3:
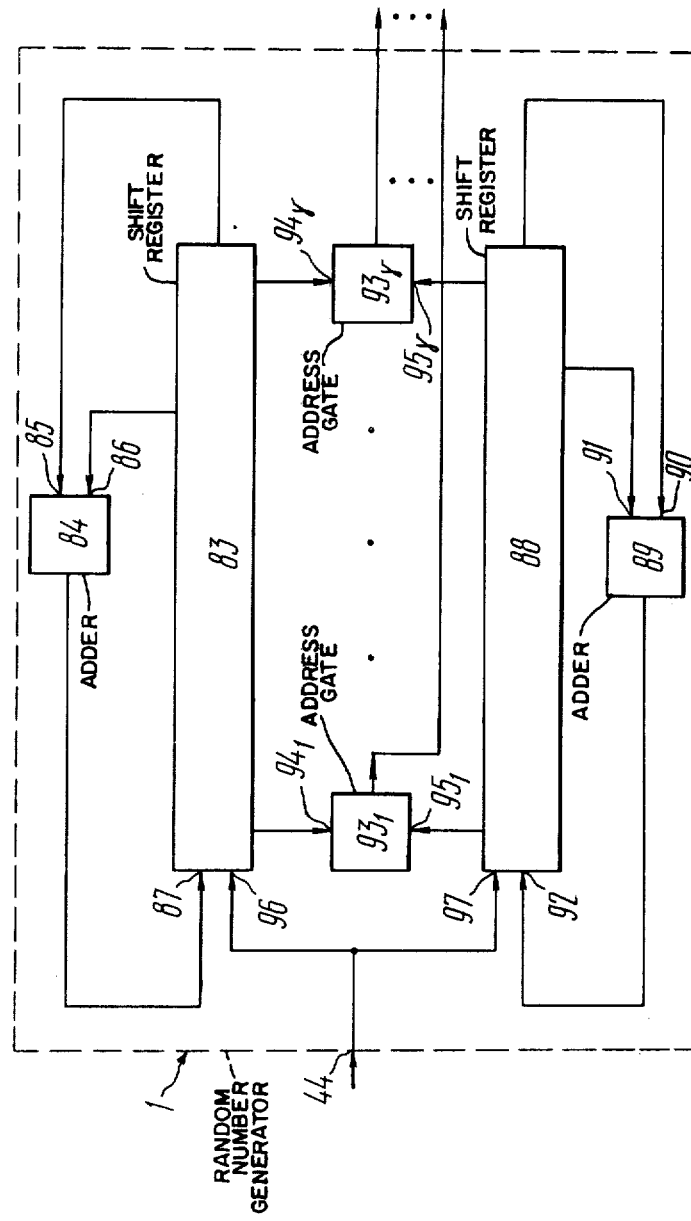
FIG. 3 is a block diagram of a random-number generator, in accordance with the invention.

The random-number generator 1 comprises a w-digit shift register 83 (FIG. 3), a modulo 2 adder 84 with an input 85 connected to an output of the register 83, an input 86 connected to an output of the i-th digit of the shift register 83, and an output connected to an input 87 of the shift register 83, a u-digit shift register 88, and a modulo 2 adder 89 with an input 90 connected to an output of the u-digit register 88, an input 91 connected to an output of the j-th digit of the u-digit shift register 88, and an output connected to an input 92 of the u-digit shift register 88.

The random-number generator 1 also comprises address gates $93_1, \ldots, 93_\gamma$ with inputs $94_1, \ldots, 94_\gamma$ connected to respective outputs of the w-digit shift register 83, inputs $95_1, \ldots, 95_\gamma$ connected to respective outputs of the u-digit shift register 88, and outputs connected to the multi-channel output of the generator 1 which is connected to the multi-channel input 3 (FIG. 1) of the clock 2.

An input 96 (FIG. 3) of the w-digit shift register 83 is interconnected with a second input 97 of the u-digit register 88 and connected to the input 44 of the generator 1.

The stochastic data rounding units 4 (FIG. 1) are designed identically.

Figure 4:
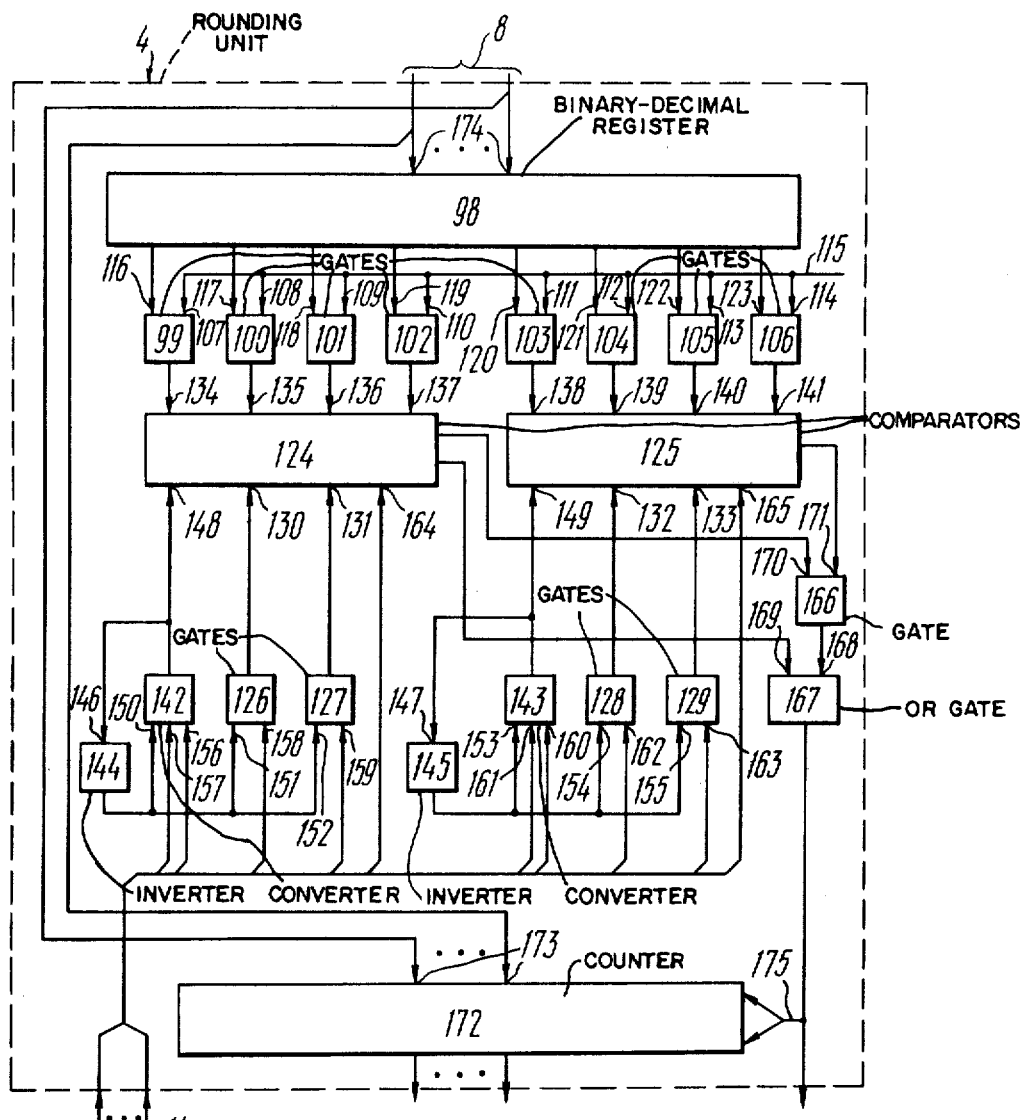
FIG. 4 is a block diagram of a stochastic data rounding unit, in accordance with the invention.

FIG. 4 illustrates a block diagram of one of the stochastic data rounding units, for instance, the unit 4.

The stochastic data rounding unit 4 comprises a binary-decimal register 98 and gates 99,100,101,102,103,104,105,106, their inputs 107,108,109,110,111,112,113,114 being interconnected and coupled to a clock line 115 and their inputs 116,117,118,119,120,121,122,123 being connected to respective outputs of the binary-decimal register 98.

The unit 4 also comprises comparator circuits 124,125 and additional gates 126,127,128,129 with their outputs connected to respective inputs 130,131 of the comparator circuit 124 and to inputs 132,133 of the comparator circuit 125. Other inputs 134,135,136,137 of the comparator circuit 124 and inputs 138,139,140,141 of the comparator circuit 125 are connected to outputs of respective gates 99–106.

The unit 4 comprises converters 142,143 and inverters 144,145 with inputs 146,147 connected to outputs of the converters 142,143 which, in turn, are connected to inputs 148,149 of the comparator circuits 124 and 125, respectively. An output of the inverter 144 is connected to an input 150 of the converter 142, to an input 151 of the additional gate 126 and to an input 152 of the additional gate 127.

An output of the inverter 145 is connected to an input 153 of the converter 143, to an input 154 of the additional gate 128, and to an input 155 of the additional gate 129.

Inputs 156,157 of the converter 142, an input 158 of the additional gate 126, an input 159 of the additional gate 127, inputs 160,161 of the converter 143, an input 162 of the additional gate 128, an input 163 of the additional gate 129, and also an input 164 of the comparator circuit 124 and an input 165 of the comparator circuit 125 are connected to the multi-channel input 14 of the unit 4.

In addition, the unit 4 comprises an additional gate 166, an OR circuit 167 with one input 168 connected to an output of the additional gate 166 and the other input 169 connected to the output of the comparator circuit 124, the other output of which is connected to an input 170 of the additional gate 166, an input 171 of the additional gate 166 being connected to the output of the comparator circuit 125, and a counter 172 with a multi-channel input 173 connected to the multi-channel input 8 of the unit 4 which is also connected to a multi-channel input 174 of the register 98. A count input 175 of the counter 172 is connected to the output of the OR circuit 167 and to the output of the unit 4, and the multi-channel output of the counter 172 is connected to the multi-channel output of the unit 4.

The data accumulator 36 comprises a total counter 176 (FIG. 5) and shift registers $177_1, 177_2, \ldots, 177_\phi$ with inputs $178_1, 178_2, \ldots, 178_\phi$ connected to respective outputs of the total counter 176 and other inputs $179_1, 179_2, \ldots, 179_\phi$ interconnected and coupled to an input 180 of the total counter 176 which is connected to the input 50 of the accumulator 36.

A count input 181 of the total counter 176 is connected to the input 37 of the accumulator 36, and a multi-channel input $182_1, 182_2, \ldots, 182$ of the total counter 176 is connected to the multi-channel input 38 of the accumulator 36 and to the outputs of the respective shift registers $177_1, 177_2, \ldots 177$, which are connected to the multi-channel input 41 (FIG. 1) of the read-only storage 39.

Figure 6:
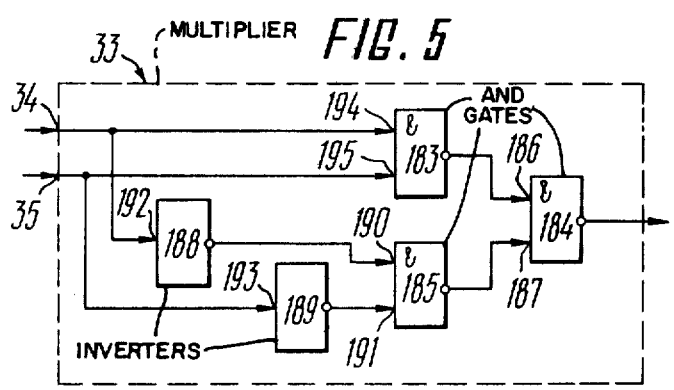
FIG. 6 is a block diagram of a stochastic multiplier in accordance with the invention.

The single-time step multiplier 33 comprises AND circuit 183 (FIG. 6), AND circuit 184 and AND circuits 185 with an inverted output, outputs of the AND circuits 183 and 185 being connected to respective inputs 186,187 of the AND circuit 184, an output of which is the output of the multiplier 33 and is connected to the input 37 (FIG. 1) of the accumulator 36.

The single-time step multiplier 33 (FIG. 6) also comprises inverters 188 and 189, outputs of which are connected to respective inputs 190,191 of the AND circuit 185, an input 192 of the inverter 188 and an input 193 of the inverter 189 being connected, respectively, to inputs 194,195 of the AND circuit 183 and coupled to the inputs 34 and 35 of the multiplier 33.

The operating principle of the proposed special-purpose digital computer for statistical data processing, illustrated in FIG. 1, is as follows.

Let it be assumed, for example, that we have hydrometeorological information supplied by temperature transmitters or water salinity transmitters, and it is necessary to process this information, i.e. calculate its statistical characteristics, such as:

mathematical expectation $m_x$;

autocorrelation function $R_{xx}(1)$;

spectral power density $S_x(P)$;

unconditional entropy $H(x)$.

Random processes which describe the temperature or water salinity are taken off the transmitters as arrays N of a random pulse sequence of numbers in a binary-decimal code and are entered into the special-purpose digital computer.

Prior to starting operation, all units and circuits of the computer must be set to zero. Depending on the required accuracy of calculating statistical characteristics, the length of the array N to be processed is specified in the clock 2.

The following information is stored in the read-only storage 39: the values of the functions $\cos(\pi/\kappa) \cdot \mathrm{lp}$, $-P_i \log P_i$, $\log_{2 n_0}{}^n$, "correlation window" functions and microinstructions.

To compute statistical characteristics of any of the two random processes, a random pulse sequence described by the random functions Y(t) or X(t) and represented, for example, in a binary-decimal r-digit code, is applied through the data lines 10 or 11 to the multi-channel input 8 and 9 of the unit 4 or 5.

Assume that binary-decimal r-digit codes come from the data lines 11 to the q-digit unit 5. At the same time, a sequence of independent uniformly distributed pseudorandom numbers is applied from the output of the generator 1 through the clock 2 to the multi-channel input 15 of the unit 5.

The sequence of r-digit numbers entered into the unit 5 is stochastically rounded off in this unit down to $r-q+1$ digits and sent through the unit 17 and the receiving register 23 to the multi-channel input 29 of the unit 28. Thus, b first numbers of the data array N will be written in the unit 28 within c operating cycles of the special-purpose digital computer.

When computing the values of the mathematical expectation $m_x$ and the autocorrelation function $R_{xx}(1)$, the first number in the data array N is written from the multi-channel output of the unit 28 into the receiving register 22.

The information from the multi-channel output of the receiving register 22 is delivered to the multi-channel input 54 of the unit 6 whose multi-channel input 52 receives a sequence of uniformly-distributed independent pseudo-random numbers applied from the output of the generator 1 through the clock 2. Within the first operating cycle, information from the output of the unit 6 is written in the data accumulator 36. Then a synchronous shift operation is performed on the data held in the unit 28 and the data accumulator 36. After that, the second value of the number is applied from the multi-channel output of the unit 28 to the receiving register 24. Further on, the value of the first number is delivered from the receiving register 22 to the multi-channel input 54 of the unit 6, and the value of the second number is delivered from the receiving register 24 to the multi-channel input 30 of the unit 7. The values of the first and the second numbers arriving at the units 6 and 7, respectively, are rounded off to $r'$ bits and sent to the inputs 34 and 35 of the unit 33 where a stochastic multiplication operation is performed and the result is written in the data accumulator 36. The process repeats C times and all the values obtained are stored in the data storage 36. The computation cycle is repeated depending on a desired accuracy and the specified number array.

Thus, the above operations result in computation of the mathematical expectation $m_x$ and the value $$\frac{1}{N-1} \sum_{I=1}^{N-1} x_i x_{i+1}$$

of the autocorrelation function $R_{xx}(1)$.

If the mathematical expectation $m_x$ is to be squared, data stored in the accumulator 36 is sent to the multi-channel inputs 8 and 9 of the units 4 and 5. From the multi-channel outputs of the units 4,5, the data is applied to the gate units 16 and 17. Further on, the data goes to the inputs 34 and 35 of the simultaneous multiplier 33 through the multi-channel inputs 25 and 26 of the receiving registers 22 and 23, and through the multi-channel inputs 54 and 30 of the units 6 and 7. The result taken off the output of the multiplier 33 is written in the data accumulator 36. The above process is repeated continuously, the number of repetition cycles depending on the required computation accuracy.

In order to subtract the squared mathematical expectation $m_x^2$ from the expression $$\frac{1}{N-1} \sum_{I=1}^{N-1} x_i \cdot x_{i+1},$$

information in the form of a binary code proportional to $m_x^2$ is applied from the output of the unit 4 through the unit 16, the receiving register 22, the unit 6 and the multiplier 33 to the input 37 of the data accumulator 36. In the accumulator 36, the binary-coded information is stochastically subtracted from $b$ values of the ordinates of the autocorrelation function $R_{xx}(1)$ which are stored in the same accumulator 36. Then the values of $m_x^2$ are written again via the unit 4, unit 16, receiving register 22 and the unit 6 into the data accumulator 36, the process going on continuously until the required accuracy of computing the autocorrelation function $R_{xx}(1)$ is obtained.

Thus, after the above conversions, the accumulator 36 will hold the values of the autocorrelation function $R_{xx}(1)$.

Subsequently, in response to a control signal from the operation synchronization unit or clock 2 applied to the multi-channel input 40 of the read-only memory 39, the value of the "correlation window" function $B_1$ is sent from the multi-channel output of the read-only memory 39 to the multi-channel input 43 of the adder 31. The information from the output of the adder 31 is delivered to the input 34 of the single-time step multiplier 33 through the receiving register 22 and the unit 6. Simultaneously, the value of the autocorrelation function $R_{xx}(1)$ stored in the data accumulator 36 is applied via the unit 5, gate unit 17, receiving register 23, the shift register unit 28, receiving register 24 and the unit 7 to the input 35 of the simultaneous multiplier 33. In the multiplier 33, the autocorrelation function $R_{xx}(1)$ and the "correlation window" function $B_1$ are multiplied, with the product being written in the data accumulator 36. This process is repeated $b$ times on all the values of the autocorrelation function $R_{xx}(1)$, and the values of $R_{xx}(1)$ are written in the unit 28 within C operating cycles of the special-purpose digital computer. All the results computed and written in the accumulator 36 are stored in this accumulator.

To calculate spectral power density $S_x(P)$, the value $\cos \pi/\kappa \cdot l \cdot p$ is sent from the read-only memory 39 via the adder 31, receiving register 22, and the unit 6 to the input 34 of the multiplier 33. The value of the autocorrelation function $R_{xx}(1)$ is applied to the input 35 of the multiplier 33 in the same way as described previously. In the multiplier, the value $\cos \pi/\kappa \cdot l \cdot p$ and that of the autocorrelation function $R_{xx}(1)$ are multiplied, and the product is sequentially written from the output of the multiplier 33 into the data accumulator 36. The computation accuracy depends on the number of times the ordinate of the autocorrelation function $R_{xx}(1)$ is multiplied by the value of $\cos \pi/\kappa \cdot l \cdot p$. The subsequent values of $\cos \pi/\kappa \cdot l \cdot p$ are obtained identically and the process is repeated with multiplication by the second ordinate of the autocorrelation function $R_{xx}(1)$, etc. This occurs $b$ times, and the entire cycle of computing the spectral power density $S_x(p)$ whose result is held in the data accumulator 36 is performed within 2 c2 operating cycles.

The calculating the value of unconditional entropy H(x) or H(y) of random processes, the clock 2 disconnects the random-number generator 1 from the units 4,5,6 and applies control signals, of which one comes to the input 13 of the quantization step counter 12, while the other two arrive at the inputs 18 and 19 of the units 16 and 17, respectively, and disable these units 16 and 17. When computing the values of unconditional entropy H(x), H(y), the probabilities of any $i$-th state of implementation $x_i$ of a random process are estimated as the frequencies with which the values of these measurements fall into respective amplitude intervals in the sample array N.

A random pulse sequence described by the random functions X(t) or Y(t) is applied to the multi-channel input 8 or 9 of the units 4 or 5, respectively, the other multi-channel inputs 14 or 15 of the units receiving signals from the multi-channel outputs of the quantization step counter 12. The units 4 and 5 and the counter 12 are used to determine the amount of the amplitude interval of the implementation $x_i$ whose value is represented in a binary code. These values of the amplitude interval of the implementation $x_i$ are delivered from the multi-channel output of the unit 4 or 5 via the multi-channel input 38 into the data accumulator 36 which accumulates and counts the number of elaborations $x_i$ which fall into a corresponding amplitude interval. When sampling the information array N of the size N = $2^k$ where $k$ equal to 1,2 . . . $w$ is an integer exponent of a binary notation base, the division operation $\eta i/N$ to estimate probability $P_i$ of the measurements of a random pulse sequence falling into an amplitude interval is replaced by a transfer of a binary point in the value of each substantialization $x_i$, which amounts to a shift of data in the accumulator 36. Then address signals are formed in the accumulator 36 from the estimated probabilities $P_i$ whose values are stored in the accumulator 36 and are the addresses of the read-only memory 39. These address signals are sent from the multi-channel output of the accumulator 36 to the multi-channel input 41 of the read-only memory 39. The information proportional to the value $P_i \log_2 P_i$ in accordance with formula (6) is applied from the multi-channel output of the read-only memory 39 to the multi-channel input 43 of the adder 31 as the first operand. Then, in response to a control signal from the clock 2 coming to the multi-channel input 40 of the read-only memory 39, the values of the correction factor $a_n$ are delivered from the multi-channel output of the read-only memory 39. These values of $a_n$ go through the multi-channel input 43 to the adder 31 as the second operand. In the adder 31, the values of $P_i \log_2 P_i$ are summed up with the correction factor $a_n$, and the result of the addition which gives the unconditional entropy H($x$) is delivered through the multi-channel output of the adder 31 to the output lines 32 and further to the peripheral devices. The peripherals also receive from the output buses 32 other statistical characteristics: the expected value $m_x$, autocorrelation function $R_{xx}(1)$ and spectral power density $S_x(p)$ which are held in the data accumulator 36.

In this way, the special-purpose digital computer for statistical data processing is employed for processing given meteorological information represented by random processes, i.e. the above statistical characteristics of this information were calculated. The knowledge of statistical characteristics permits making reliable short-term and long-term meteorological forecasts.

Figure 2:
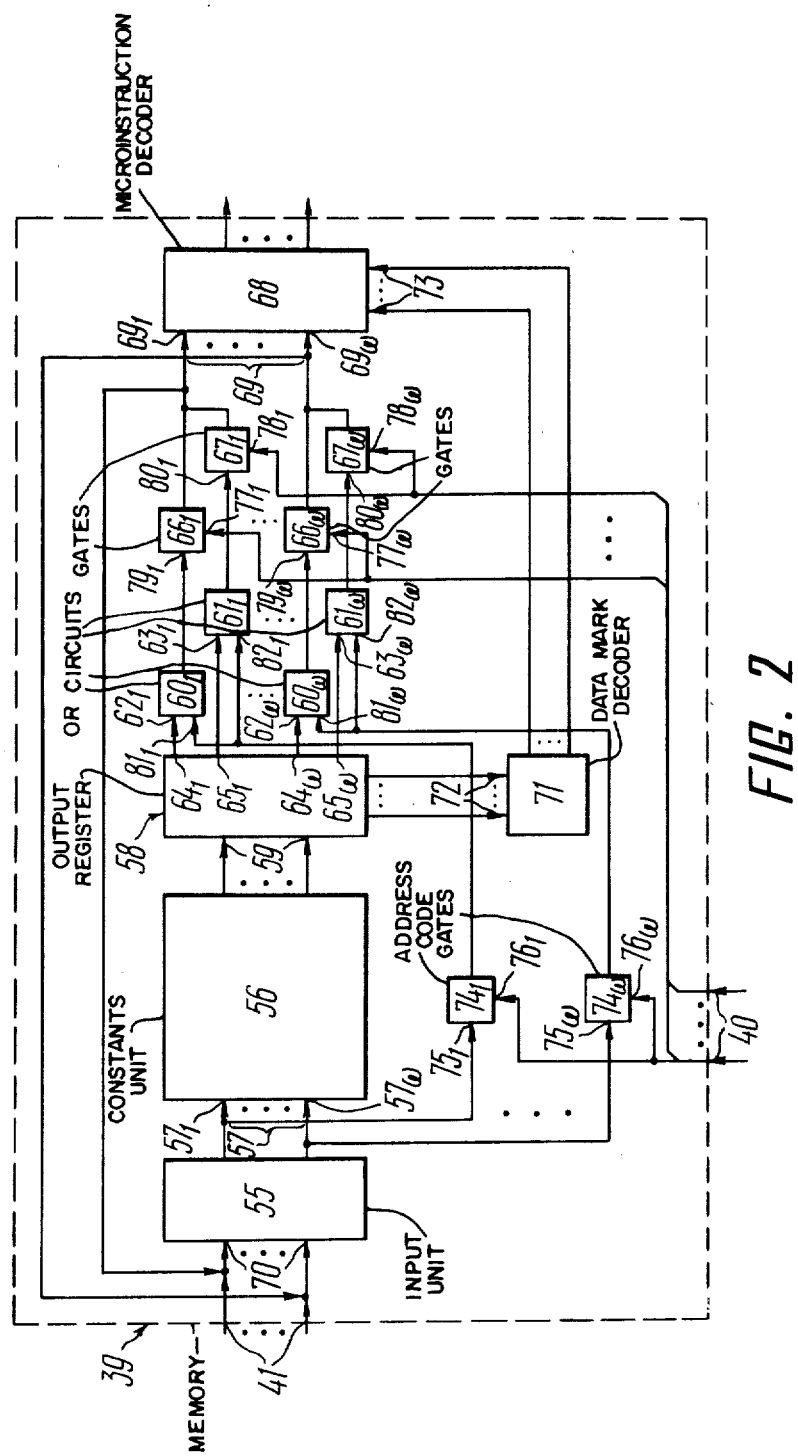
FIG. 2 is a block diagram of a read-only memory, in accordance with the invention.

The read-only memory 39 illustrated in FIG. 2 operates as follows.

The read-only memory 39 depends for its operation on the superposition principle. After initial setting of the address register, counter and address decoder (not shown) in the input unit 55 and of the output register 58, an information address code is sent from the data accumulator 36 through the multi-channel input 41 of the read-only memory 39 to the multi-channel input 70 of the input unit 55. Then the information address code is delivered from the multi-channel output of the input unit 55 to the multi-channel input 57 of the constants unit 56 and to the inputs $75_1, \ldots, 75_\omega$ of the address code gates $74_1, \ldots, 74_\omega$. In the constants unit 56, the information address code is decoded and the information corresponding to a specified address is furnished from the constants unit 56 through the multi-channel input 59 and the output registers 58 to the inputs $62_1, \ldots, 62_\omega$; $63_1, \ldots, 63_\omega$ of the OR circuits $60_1, \ldots, 60_\omega$; $61_1, \ldots 61_\omega$ for the inverted and direct codes, respectively. A control signal $f_1(t)$ is applied from the operation synchronization unit or clock 2 through the multi-channel 40 of the read-only memory 39 to the inputs $76_1, \ldots, 76_\omega$ (FIG. 2) of the address code gates $74_1, \ldots, 74_\omega$.

The inputs $77_1, \ldots, 77_\omega$ of the inverted code gates $66_1, \ldots, 66_\omega$ accept the signal $f_2(t)$, the inputs $78_1, \ldots, 78_\omega$ of the direct code gates $67_1, \ldots, 67_\omega$ receive the control signal $f_3(t)$. Let us denote a variable depending on the address code Y, and a variable held in the constants unit 56 of the read-only storage 39. Then, depending on the combination of signals $[f_1, f_2, f_3]'$ applied from the multi-channel output of the operation synchronization unit or clock 2 (FIG. 1) to the respective gates $74_1, \ldots, 74_\omega$, $66_1, \ldots, 66_\omega$, $67_1, \ldots, 67_\omega$ (FIG. 2), the multi-channel inputs $69_1, \ldots, 69_\omega$ of the decoder 68 and 70 of the input unit 55 will carry variable information $\Omega(t)$ whose code is determined by operations over the variables Y and X listed in Table 1.

Table 1

| $[f_1]'$ | $[f_2]'$ | $[f_3]'$ | $[\Omega]'$ |
|---|---|---|---|
| 0 | 0 | 0 | 0 |
| 0 | 0 | 1 | $\psi$ |
| 0 | 1 | 0 | $\psi$ |
| 0 | 1 | 1 | 1 |
| 1 | 0 | 1 | $\gamma\vee\psi$ |
| 1 | 1 | 0 | $\gamma\vee\psi$ |

In this case, restrictions $$[f_1\bar{f_2}\bar{f_3} \vee f_1 f_2 f_3]' = 0 \tag{1}$$

are imposed on the signals $[f_1, f_2, f_3]'$. Information from the top digits of the output register 58 is sent through the multi-channel input 72 to the data mark decoder 71 and further through the multi-channel input 73 to the decoder 68, the information from the multi-channel output of the decoder 68 being delivered to appropriate units of the special-purpose digital computer for statistical data processing.

The address code gates $74_1, \ldots, 74_\omega$, the OR circuits $61_1, \ldots, 61_\omega$, and the gates $66_1, \ldots, 66_\omega$, $67_1, \ldots, 67_\omega$ permit logical operations to be performed over the variables Y and $\psi$, thus increasing the information capacity of the constants unit 56 without increasing its dimensions; in other words, information compression is provided in the computer.

The random-number generator 1 (FIG. 3) operates as follows. The W-digit shift register 83 and the first modulo 2 adder 84 generate a sequence of maximum-length binary numbers with a period W, while the $u$-digit register 88 and the modulo 2 adder 89 generate a sequence of maximum-length binary numbers with a period U. The values of the periods W and U of the binary number sequences are coprime numbers, as a result of which the outputs of the digit modulo 2 adders $93, \ldots, 93_\gamma$ produce a sequence of uniformly distributed independent pseudo-random numbers which are not correlated within time $$\tau \geq U = 2^u - 1, \tag{2}$$

where U is the period of the pseudo-random binary sequence generated by the U-digit shift register 88, the digit capacity of which is larger than the digit capacity of the W-digit shift register 83, i.e. U>W. Uniformly distributed binary pseudo-random numbers are produced in each operating cycle of the random-number generator 1 at the outputs of the digit modulo-2 adders $93_1, \ldots, 93_\gamma$.

Uniformly-distributed pseudo-random numbers in the form of 0, $v_1, v_2, v_3, v_4, v_5, \ldots; v_1^1, v_2^1, v_3^1, v_4^1, v_5^1 \ldots$ are formed at the multi-channel output of the generator 1 with a number of digits $z \geq w + u$ and delivered with a period $$T = W \cdot U = (2^w - 1)\cdot(2^u - 1) \tag{3}$$

The operating principle of the stochastic data rounding unit 4 is as follows. A random pulse number sequence is applied via the multi-channel input 8 of the unit 4 through the multi-channel inputs 173 and 174 to the counter 172 and the register 98, respectively.

Information contained in the low-order digits of the random pulse number sequence which has the form $$\lambda = 0; \lambda_1, \lambda_2, \lambda_3, \lambda_4; \lambda_1', \lambda_2', \lambda_3', \lambda_4', \ldots, \lambda_1'', \lambda_2'', \lambda_3'', \lambda_4'',$$

is sent through the register 98 to the inputs 116, 117, 118, 119, 120, 121, 122, 123 of the gates 99–106; the other combined inputs 107, 108, 109, 110, 111, 112, 113, 114 accept clock gating pulses via the clock line 115 from the clock 2 (FIG. 1). The signals from the outputs of the gates 99–102 (FIG. 4) go via the inputs 134–137 to the comparator circuit 124, and the signals from the outputs of the gates 103–106 are applied via the inputs 138–141 to the comparator circuit 125. The probabilities of the appearance of signals in each digit of a binary-decimal tetrade across the outputs 134–141 of the comparator circuits 124 and 125 are:

$$P_1(\lambda_1'') = \frac{1}{5}, \quad P_2(\lambda_2'') = \frac{2}{5},$$

$$P_3(\lambda_3'') = \frac{2}{5}, \quad P_4(\lambda_4'') = \frac{1}{2}$$

The multi-channel input 14 of the stochastic data rounding unit 4 receives from the random-number generator 1 (FIG. 1) signals of a uniform pseudo-random number sequence in the form $$0; v_1, v_2, v_3, v_4, v_5; v_1^1, v_2^1, v_3^1, v_4^1, v_5^1 \ldots$$

with the probability of their occurrence equal to $\frac{1}{2}$. Then, these signals go through the inputs 156 (FIG. 4), 157, 158, 159, 160, 161, 162, 163 to the converter 142, gates 126 and 127, converter 143, and gates 128 and 129 where they are converted into probabilities P = 1/5 and P = 2/5 with the aid of the inverters 144 and 145. After the conversion, the signals of the uniform pseudo-random number sequence are delivered to the inputs 148, 130, 131, 164 of the comparator circuit 124 and to the inputs 149, 132, 133, 165 of the comparator circuit 125 with the following probabilities of their occurrence:

$$P_1(v_1') = \frac{1}{5}, \quad P_2(v_2') = \frac{2}{5},$$

$$P_3(v_3') = \frac{2}{5}, \quad P_4(v_4') = \frac{1}{2}$$

and are compared with the signals applied to the other inputs 134–137 and 138–141 of the comparator circuits 124 and 125. One output of the comparator circuit 124 gives out a "Greater than" signal, which is delivered to the input 169 of the OR circuit 167; the other output of this comparator circuit 124 produces an "Equal" signal going to the input 170 of the additional gate 166, the other input 177 of the gate accepting a "Greater than" signal from one output of the comparator circuit 125. The output signal of the additional gate 166 is delivered to the input 168 of the OR circuit 167. A stochastically coded number sequence from the output of the OR circuit 167 is applied to the count input 175 of the counter 172 wherein the multi-channel output gives out a stochastically rounded number sequence while the single-channel output of the unit 4 produces a stochastically coded random number sequence.

Figure 5:
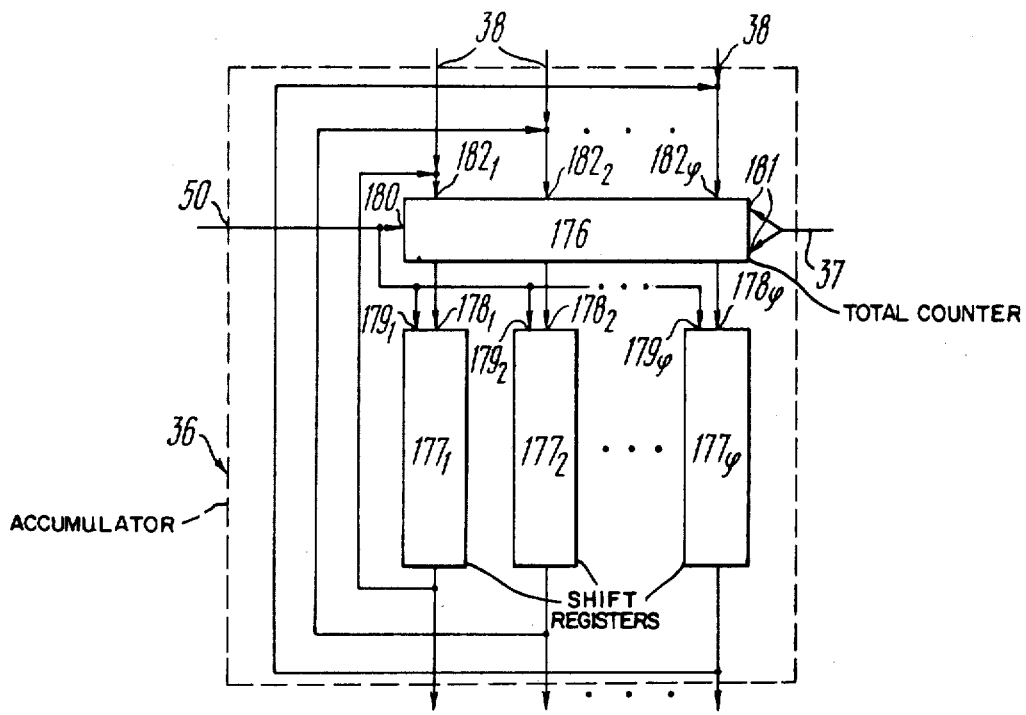
FIG. 5 is a block diagram of a data accumulator, in accordance with the invention.

The data accumulator 36 whose diagram is illustrated in FIG. 5 operates as follows. Prior to starting operation, the signal applied to the input 50 of the data accumulator 36 through the input 180 of the total counter 176 and to the inputs $179_1, 179_2, \ldots 179_{100}$ of the shift registers $177_1, 177_2, \ldots, 177$ alternate sets the total counter 176 and the shift registers $177_1, 177_2, \ldots 177$ alternate to their initial states. Thus, for instance, when unconditional entropy H (x) is computed, information is delivered from the multi-channel outputs of the units 4 or 5 through the multi-channel input 38 of the data accumulator 36 to the multi-channel input $182_1, 182_2, \ldots 182_\varphi$ of the total counter 176. In all the other calculations, information, which is the calculation results, comes to the input 37 of the data accumulator 36 and further to the count input 181 of the total counter 176 and is rewritten in the digits of the shift registers $177_1, 177_2, \ldots 177_\varphi$. Then, the information in the shift registers $177_1, 177_2, \ldots 177_\varphi$ is shifted. After that, the count input 181 of the multi-channel input $182_1, 182_2, \ldots 182_\varphi$ of the total counter 176 receives the next information to be added to the result supplied from the last digit place of the shift registers $177_1, 177_2, \ldots, 177_\varphi$, and the value obtained is rewritten into the first digit places of the shift registers $177_1, 177_2, \ldots, 177_\varphi$ via the multi-channel output of the total counter 176 and the multi-channel input $178_1, 178_2, \ldots, 178_\varphi$. Thereupon, the information in these registers is shifted again, and the computation result is delivered from the multi-channel output of the data accumulator 36 into appropriate units of the special-purpose digital computer for statistical data processing.

The single-time step multiplier 33 used for stochastic multiplication of input values stochastically coded in a single-line bipolar code (the diagram of the multiplier is given in FIG. 6) operates as follows. The pulses of a stochastically coded random-number sequence represented in a single-line bipolar form are applied from the stochastic data rounding units 6, (FIG. 1), 7 to the inputs 34 and 35 of the multiplier 33.

The operating principle of the multiplier 33 is illustrated in Table 2 (columns I, II denote the inputs 34 and 35, column III corresponds to the output of the multiplier 33).

Table 2

| I | II | III |
|---|----|----|
| 0 | 0 | 1 |
| 0 | 1 | 0 |
| 1 | 0 | 0 |
| 1 | 1 | 1 |

The table shows that the simultaneous multiplier 33 is a conventional EXCLUSIVE OR circuit.

Let P(A) and P(B) be probabilities of the appearance of the "1" signal at the inputs 34, 35, respectively, and P(C)⁻ the probability of the appearance of this signal at the output of the multiplier 33. Since the multiplier 33 performs the EXCLUSIVE OR operation, the probability of the occurrence of the output signal may be written as:

$$P(C) = P(A)P(B) + [1 - P(A)] \cdot [1 - P(B)] \quad (4)$$

Substituting into this expression $$P(A) = \frac{1 + A_o}{2}, \quad P(B) = \frac{1 + B_o}{2}, \quad P(C) = \frac{1 + C_o}{2} \quad (5)$$

where $A_o$, $B_o$ are input signals, and $C_o$ is an output signal variable in the range from $-1$ to $+1$, we obtain $$\frac{1 + C_o}{2} = \frac{1 + A_o B_o}{2} \quad (6)$$

whence $$C_o = A_o B_o \quad (7)$$

that is, the output of the multiplier 33 carries a pulse sequence proportional to the product of the input signals.

The proposed invention permits calculation of the statistical characteristics of random processes, for example, unconditional entropy, thus expanding the functional capabilities of the computer, broadening the range of its application, providing for data compression, and cutting down the hardware costs of the special-purpose digital computer for statistical data processing.

What is claimed is:

1. A special-purpose digital computer, comprising:
input data lines;
output lines;
a random-number generator for producing a uniform pseudo-random number sequence having
an input and a multi-channel output;
a clock having
an input, a multi-channel input, outputs and multi-channel outputs,
said multi-channel input of said clock being connected to said multi-channel output of said random-number generator;
a quantization step counter for determining the value of a quantization amplitude interval having
an input and first and second multi-channel outputs,
said input of said quantization step counter being connected to a first of said outputs of said clock;
first, second, third and fourth stochastic data rounding units for linear conversion of the code into its probability and for stochastic rounding of numbers having
first and second multi-channel inputs and a multi-channel output,
said first multi-channel inputs of said first and said second rounding units being connected to said input data lines,
said second multi-channel inputs of said first and second stochastic data rounding units being connected to said first and second multi-channel outputs of said quantization step counter, being coupled to a first of said multi-channel outputs of said clock and being connected to said second multi-channel inputs of said third and fourth stochastic data rounding units;
a shift register unit having an input, a multi-channel input and a multi-channel output;
first, second and third receiving registers having an input, a multi-channel input and a multi-channel output,
said multi-channel output of said first receiving register being connected to said first multi-channel input of said third stochastic data rounding units,
said multi-channel input of said third receiving register being interconnected with said multi-channel input of said first receiving register, being coupled to said multi-channel output of said shift register unit and being connected to said multi-channel input of said shift register unit, to said multi-channel outputs of said second and third receiving register and to said first multi-channel input of said fourth stochastic data round-off unit;
first and second gate units having
an input, a multi-channel input and a multi-channel output,
said multi-channel inputs of said first and second receiving registers being connected to said multi-channel outputs of said first and second gate units, respectively;
said multi-channel inputs of said first and second gate units being connected to multi-channel outputs of said first and second stochastic data rounding units, respectively,
said inputs of said gate units being connected to respective outputs of said clock;
an adder having an input, a multi-channel input and multi-channel output,
said multi-channel output of said adder being connected to said multi-channel input of said first receiving register and being connected to some of said output lines;
a data accumulator for accumulation and group shift of information having
inputs, a multi-channel output and a multi-channel input,
said multi-channel input of said data accumulator being connected to said multi-channel outputs of said first and second stochastic data rounding units;
a read-only memory to store harmonic functions, "correlation window" functions, the values of the functions of the form $$\eta = -P \log_2 P,$$

and microinstructions having
first and second multi-channel inputs, outputs and a multi-channel output,
said first multi-channel input of said read-only memory being connected to a second of said multi-channel outputs of said clock,
said outputs of said read-only memory being connected to said inputs of said random-number generator, said clock, said first, second and third receiving registers, said adder, and said shift register unit and to a first of said inputs of said data accumulator,
said multi-channel output of said read-only memory being connected to said multi-channel input of said adder,
said second multi-channel input of said read-only memory being connected to said multi-channel output of said data accumulator and being coupled to other of said output lines and to said first multi-channel inputs of said first and second stochastic data rounding units; and a single-time step multiplier for stochastic multiplication of numbers having inputs and an output, said inputs of said multiplier being connected, respectively, to outputs of said third and fourth stochastic data rounding units, and said output of said multiplier being connected to said outputs of said third and fourth stochastic data rounding units and being coupled to said input of said data accumulator.

2. A special-purpose digital computer as set forth in claim 1, wherein the read-only memory comprises:

an input unit for receiving, decoding and shifting an information address code having a multi-channel input and a multi-channel output, said multi-channel input of said input unit being said second multi-channel input of said read-only memory;

a constants unit for storing permanent information having a multi-channel input and a multi-channel output, said multi-channel input of said constants unit being connected to said multi-channel output of said input unit;

an output register for receiving information having a multi-channel input, outputs and a multi-channel output, said multi-channel input of said output register being connected to said multi-channel output of said constants unit;

a microinstruction decoder having first and second multi-channel inputs and a multi-channel output, said multi-channel outputs of said microinstruction decoder being the multi-channel output of said read-only memory;

address code gates having first and second inputs and an output, said first inputs of said address code gates being connected to said multi-channel output of said input unit, said second inputs of said address code gates being interconnected and coupled to the inputs of said first multi-channel input of said read-only memory;

a data mark decoder having a multi-channel input and a multi-channel output, said multi-channel input of said data mark decoder being connected to said multi-channel output of said output register, said multi-channel output of said data mark decoder being connected to said second multi-channel input of said microinstruction decoder;

OR circuits for direct and for inverted code having first and second inputs and an output, said first inputs of said OR circuits for the direct and inverted codes being connected to respective outputs of said output register, said second inputs of said OR circuits for the inverted code being connected to said second inputs of said OR circuits for the direct code and coupled to said outputs of said address code gates; and direct and inverted code gates having first and second inputs and an output, said outputs of said direct and inverted code gates being interconnected and coupled to said first multi-channel input of said microinstruction decoder and to said multi-channel input of said input unit, said outputs of said OR circuits for the direct code being connected to said first inputs of said direct code gates, said outputs of said OR circuits for the inverted code being connected to said first inputs of said inverted code gates, and said second inputs of said direct and of said inverted code gates being connected to one of the inputs of said first multi-channel input of said read-only memory.

* * * * *